United States Patent
Beers et al.

(10) Patent No.: US 6,846,444 B2
(45) Date of Patent: Jan. 25, 2005

(54) SELF-RELEASING CURING BLADDERS

(75) Inventors: Roger Neil Beers, Uniontown, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 166 days.

(21) Appl. No.: 10/319,065

(22) Filed: Dec. 13, 2002

(65) Prior Publication Data

US 2004/0113318 A1 Jun. 17, 2004

(51) Int. Cl.$^7$ .................. B29C 35/02; B29D 30/00
(52) U.S. Cl. .................. 264/315; 425/43; 425/52
(58) Field of Search .................. 425/43, 52; 249/65; 264/315

(56) References Cited

U.S. PATENT DOCUMENTS

| | | | | |
|---|---|---|---|---|
| 2,749,323 A | * | 6/1956 | Brafford et al. | 425/43 |
| 3,759,306 A | | 9/1973 | Greiner et al. | 152/374 |
| 3,842,883 A | | 10/1974 | Masson et al. | 152/354 |
| 4,853,069 A | * | 8/1989 | Williams et al. | 425/52 |
| 5,023,301 A | | 6/1991 | Burlett et al. | 525/232 |
| 5,236,030 A | * | 8/1993 | Misawa et al. | 156/123 |
| 5,538,218 A | | 7/1996 | Patitsas et al. | 249/65 |
| 5,580,513 A | | 12/1996 | Patitsas et al. | 264/501 |
| 5,593,701 A | * | 1/1997 | Graves et al. | 425/52 |
| 5,728,311 A | | 3/1998 | Patitsas et al. | 249/65 |
| 6,013,218 A | | 1/2000 | Patitsas et al. | 264/315 |
| 6,015,525 A | | 1/2000 | Patitsas et al. | 264/315 |
| 6,036,800 A | | 3/2000 | Corvasce et al. | 156/123 |
| 6,202,726 B1 | | 3/2001 | Corvasce et al. | 152/517 |
| 6,231,026 B1 | | 5/2001 | Patitsas et al. | 249/65 |
| 6,328,681 B1 | * | 12/2001 | Stephens | 492/56 |
| 6,363,989 B1 | | 4/2002 | Phelps et al. | 156/401 |
| 2002/0084039 A1 | | 7/2002 | Phelps et al. | 156/401 |

* cited by examiner

*Primary Examiner*—James P. Mackey
(74) *Attorney, Agent, or Firm*—Wood, Herron & Evans, LLP

(57) ABSTRACT

The invention relates to expandable butyl rubber bladders for use in curing presses for hydrocarbon rubbers such as pneumatic tires. The bladders are a crosslinked butyl rubber composition comprising isobutylene repeat units and the bladder composition contains ultra high molecular weight polyethylene, alone or in combination with graphite and/or fluorinated ethylene polymers, dispersed within the bladder composition. The bladder composition may also contain castor oil, corn oil and/or soya-bean oil. The invention also relates to a method of curing tires by utilizing such butyl rubber bladder.

18 Claims, No Drawings

SELF-RELEASING CURING BLADDERS

FIELD OF THE INVENTION

This invention relates to an expandable curing bladder of a butyl rubber composition containing ultra high molecular weight polyethylene for increased lubricity and release properties.

BACKGROUND OF THE INVENTION

It is important for the interfacial surface of expandable tire curing bladders of a butyl rubber composition to have adequate interfacial lubricity and sufficiently low adhesion properties between the bladder surface and the inner surface of the tire being vulcanized. Conventionally, the butyl rubber composition for a tire curing bladder contains castor oil as a lubricant which tends to bleed to the outer surface of the bladder to promote a continuing lubricity at the interface between the bladder surface and inner surface of the tire being cured. For example, see U.S. Pat. No. 3,031,423.

Use of corn oil as an internal tire cure butyl rubber bladder lubricant has also been proposed. See U.S. Pat. No. 5,580,513.

Graphite as a lubricant (see U.S. Pat. No. 5,538,218) and polytetrafluoroethylene powder as a lubricant (see U.S. Pat. No. 5,728,311) have also been proposed for use in a butyl rubber tire curing bladder.

Even with an internal lubricant, such as castor oil or corn oil for the butyl rubber bladder composition, it is often desired to apply additional lubricant to the outer bladder surface to enhance the aforesaid interfacial lubrication such as, for example, a polysiloxane-based lubricant, a practice which is well known to those skilled in such art.

From an historical perspective, pneumatic rubber vehicle tires are produced by molding and curing a green (uncured) and unshaped tire in a molding press. The green tire is pressed outwardly against a mold surface by means of an inner fluid-expandable bladder. By this method, the green tire is shaped against the outer mold surface which defines the tire tread pattern and configuration of the sidewalls. By application of heat and pressure, the tire is molded and cured at elevated temperatures.

Historically, the expansion of the bladder is accomplished by application of internal pressure to the inner bladder cavity. The pressure is provided by a fluid such as gas, hot water and/or steam, which also participates in the transfer of heat for the curing or vulcanization of the tire. The tire is then conventionally allowed to cool somewhat in the mold, sometimes aided by adding cold or cooler water to the bladder. Then the mold is opened, the bladder is collapsed by removal of its internal fluid pressure and the tire is removed from the tire mold. Such use of tire curing bladders is well known to those having skill in such art.

By such practice, it is recognized that there is substantial relative movement at the interface between the outer contacting surface of the bladder and the inner surface of the tire during the expansion phase of the bladder. Likewise, there is considerable relative movement between the outer contacting surface of the bladder and the cured inner surface of the tire during the collapse and the stripping of the bladder from the tire after the tire has been molded and vulcanized.

By such practice, it is recognized that the bladder surface can tend to stick to a tire's inner surface after the tire is cured and during the bladder collapsing part of the tire cure cycle. This adhesion may cause roughening of the bladder surface if it is not controlled. This typically reduces bladder durability and can produce defective tires.

Accordingly, it is often desired to pre-coat the bladder surface, or to pre-coat the inner surface of the green tires with a lubricant which can also transfer to the bladder surface and, thereby, provide a degree of interfacial lubricity between the outer bladder surface and inner tire surfaces during the tire's molding and curing operation. Such lubricant has sometimes been referred to as a "bladder lubricant", and can be of numerous formulations. A silicone polymer (e.g., a polysiloxane) is often used as a bladder lubricant.

It is to be appreciated that the release of the tire from its curing bladder in an industrial manufacturing setting is intimately associated with both the phenomenon of release (to prevent sticking) and the phenomenon of lubrication (to enhance slipping) between the bladder and the adjacent tire surfaces. The release aspect refers to the basic ability to avoid adhesion, or release, and the aspect of lubrication relates to enhancing the ability of the surfaces to slip and enable a movement of the bladder with respect to the tire.

Butyl rubber is commonly used in tire curing bladders. Butyl rubber is a copolymer of predominantly isobutylene with small amounts of diene monomers, usually isoprene, to give sufficient unsaturation to allow the butyl rubber to be crosslinked. Halogenated copolymers of isobutylene and para-methylstyrene are also sometimes used.

Accordingly, it is desired to provide butyl rubber curing bladders with acceptable lubricity and decreased adhesion of the bladder to cured tires.

In the description of this invention, the term "phr" is sometimes used to refer to "parts per hundred parts by weight of rubber" for various ingredients in a rubber composition.

The terms "compound", "compounded rubber" and "rubber composition" are intended to be interchangeable terms unless otherwise noted.

The terms "cure" and "vulcanize" are intended to be interchangeable terms unless otherwise noted.

The terms "green" and "uncured" are intended to be interchangeable unless otherwise noted.

SUMMARY OF THE INVENTION

The present invention provides an expandable curing bladder composition comprising butyl rubber, a curative system, and an ultrahigh molecular weight polyethylene (UHMWPE). The addition of UHMWPE to a bladder compound results in lower adhesion between the cured bladder and a green liner compound. The UHMWPE is advantageously contained in an amount of about 2–40 parts by weight per 100 parts by weight of rubber (phr) and has a melting point in the range of about 125–140° C. and a viscosity average molecular weight in a range of about 2–20 million g/mol. The bladder composition may also include graphite and/or a fluorinated ethylene polymer, for example polytetrafluoroethylene. The present invention further provides a tire curing press, containing a cured form of the expandable curing bladder composition comprising UHMWPE dispersed in the butyl rubber. The present invention also provides a method of using an expandable rubber bladder comprising the cured form of the bladder composition in which an uncured hydrocarbon rubber composition is placed in a curing mold, and the expandable rubber bladder is expanded outwardly against the inner surface of the uncured hydrocarbon rubber to force the rubber against a mold surface, followed by curing the hydrocarbon rubber, deflating the expandable bladder, and removing the cured hydrocarbon material, whereby the bladder composition containing the UHMWPE exhibits decreased adhesion to the hydrocarbon material during the curing process.

DETAILED DESCRIPTION

In accordance with this invention, an expandable curing bladder composition comprises a butyl rubber of at least one isobutylene rubbery polymer, at least one curative including from about 0.5–12 phr of a halogenated or non-halogenated phenolic resin curative for crosslinking the isobutylene rubbery polymer; and about 2–40 phr of ultra high molecular weight crystalline and linear polyethylene (UHMWPE) having a melting point in the range of about 125° C.–140° C. and a viscosity average molecular weight in the range of about 2–20 million g/mol.

In an exemplary embodiment, the UHMWPE has a viscosity average molecular weight in the range of about 5–15 million g/mol. In a further exemplary embodiment, the butyl rubber is a copolymer of isobutylene and isoprene, which contains from about 1 to about 5 wt. % units derived from isoprene, and the curatives are polychloroprene rubber and phenol-formaldehyde resin. The composition may further comprise about 2–8 phr of at least one of castor oil, corn oil and soya-bean oil. The bladder composition may also contain about 0.1–30 phr of graphite and/or polytetrafluoroethylene powder.

The present invention further contemplates a tire curing press containing a cured form of the bladder composition, and a method of using an expandable rubber bladder comprising a cured form of the bladder composition to cure a hydrocarbon rubber-based tire. The addition of UHMWPE to the bladder compound results in lower adhesion between the curing bladder and a green liner compound. Consequently, the amount of lubricant sprayed on the bladder and/or liner may be reduced or even eliminated, thereby reducing costs. The curing bladders of the present invention also exhibit lower tear propagation, which improves bladder life.

Accordingly, a tire curing bladder is provided that is made of a butyl rubber composition which contains an ultra high molecular weight polyethylene to enhance lubricity (reduce coefficient of friction) and reduce adhesion of the bladder surface to a tire innerliner surface during a tire cure operation. The UHMWPE is advantageously present in an amount of about 2 to about 40 phr, alternately about 5 to about 20 phr. The UHMWPE has a melting point (according to ISO 1628, Part 3) in a range of from about 125° C. to about 140° C. and a viscosity average molecular weight in a range of from about 2 to about 20 million g/mol, alternately about 5 to about 15 million g/mol (according to ISO 3146 Method C). Further, the composition components are advantageously mixed at a temperature at least 10° C. higher than the melting point of the UHMWPE.

The morphology of the UHMWPE is an aspect of this invention, namely a combination of its ultra high molecular weight and its preferable shape as being round, or substantially spherical in configuration. While the benefit of such morphology is not completely understood, it is believed that because the crystalline polyethylene is of such an ultra high molecular weight its spherically shaped particles retain a substantially spherical shape even after relatively high shear mixing with the rubber composition at a temperature somewhat above the melting point of the polyethylene itself. Apparently, the resultant substantially spherical polyethylene particles are beneficial for the associated rubber compositions. Dispersion of the UHMWPE in the butyl rubber imparts a self-releasing property to the curing bladder, especially when accompanied by graphite or polytetrafluoroethylene, by providing the surface of the bladder with a low coefficient of friction. Unlike the bladder lubricants, the low friction characteristic is maintained for the life of the bladder because the UHMWPE remains in the compound. Further, UHMWPE is incompatible with the halobutyl rubber compounds used in tires, such that the bladder does not adhere to or cure with the tire rubber during the tire curing process. Consequently, the use of bladder lubricants, such as silicone polymers, may be reduced or eliminated. Eliminating the lubricant sprays would also eliminate the need for spraying equipment and the manpower for operating the spraying equipment. In addition, the problem of "rim slip" may also be eliminated by reducing or eliminating the lubricant spray since rim slip occurs where overspray on the tire bead can cause the tire to slip on the rim.

Various ultra high molecular weight polyethylene polymers (UHMWPE's) are available, such as those from the Ticona Company (e.g., GUR2122™) which are referenced in the following Table A, namely UHMWPE's 1 through 4.

TABLE A

| UHMWPE | Commercial Product | Morphology | Microns Particle Size | °C. Melting Point |
|---|---|---|---|---|
| UHMWPE-1 | GUR 2122 ™ | irregular | 140 | 130–135 |
| UHMWPE-2 | GUR 2126 ™ | irregular | 30 | 130–135 |
| UHMWPE-3 | GUR 4120 ™ | round (spherical) | 120 | 130–135 |
| UHMWPE-4 | GUR 4186 ™ | round (spherical) | 60 | 130–135 |

Preferably, the morphology of the UHMWPE is of a round, substantially spherical, configuration shape in combination with the aforesaid ultra high molecular weight.

Conventional preferred butyl rubbers for use in this invention are typically copolymers of isobutylene and a minor amount of a conjugated diene such as, for example, isoprene. Desirably, the isoprene component is from 1 to 5 wt. % of the butyl rubber with the remainder (e.g., 95–99 wt. %) being derived from the isobutylene.

An alternative butyl rubber for the tire cure bladder, although less preferable, is a copolymer of at least one iso-olefin monomer and at least one para-alkylstyrene monomer that is brominated. The iso-olefin for such brominated butyl rubber may be one or more iso-olefins of 4–7 carbon atoms, (e.g., para-methylstyrene) and may be usually free of isoprene and other conjugated dienes. In practice, the brominated butyl rubber is conventionally brominated after the monomers are polymerized to form the butyl rubber. The brominated butyl rubber conventionally contains from about 0.3 to about 2 wt. % bromination. Such a brominated copolymer is EXXPRO® from Exxon Chemical with a Mooney Viscosity ML (1+8) 125° C. of 50 plus or minus 5, a para-methylstyrene content of about 5 wt. %, isobutylene content of 94 or 95 wt. %, and a total bromine content of 0.8 wt. %. A European patent application having Publication No. 0,344,021 describes how to make such polymers.

It is to be appreciated that the butyl rubber composition for the tire-curing bladder is resin-cured instead of sulfur-cured, which is a conventional practice. The resin curatives are conventionally composed of a small amount of polychloroprene rubber, which is sometimes referred to as a "chloroprene rubber" and acts as a chlorine source, and a phenol-formaldehyde resin. Such resin cure system for butyl rubber is well known to those having skill in such art.

In practice, the polychloroprene rubber co-curative is conventionally counted toward the 100 parts by weight rubber of the butyl rubber composition even though it has a separate function as a halogen containing elastomer. It may be included in amounts up to 10 or 20 wt. % of the butyl rubber when a halogen source is desirable to activate the resin cure system. In an exemplary embodiment, the butyl rubber composition comprises about 1–10 phr of polychloroprene rubber, such as Neoprene® from DuPont.

Resins for curing butyl rubber may be used in amounts from 1 to 12 phr and include conventional phenol-formaldehyde resins. Such cure systems for bladder compositions are well known to those having skill in the art. For an example, see U.S. Pat. Nos. 3,031,423 and 5,728,311.

The cured rubber compositions for use in a bladder may also contain conventional additives including fillers, stearic acid, accelerators, sulfur-vulcanizing agents, resin for curing, antiozonants, antioxidants, processing oils, activators, initiators, plasticizers, waxes, extender oils and the like.

Antioxidants and antiozonants may desirably be added to the curing bladder composition. Antioxidants prevent oxidative crosslinking or oxidative chain scission so that the modulus and fracture properties of the rubber are unchanged during exposure to oxidation especially at elevated temperatures. Antioxidants for rubber compounds in general and for butyl rubber more specifically are well known to the art. Antidegradants include antioxidants and antiozonants. Desirable amounts are from 0.1–10 phr, and more desirably about 2–6 phr. Antiozonants are compounds that prevent chain scission due to exposure to ozone. They are also well known to the art. Antidegradants include monophenols, bisphenols, thiophenols, polyphenols, hydroquinone derivatives, phosphites, phosphate blends, thioesters, naphthylamines, diphenol amines as well as other diaryl amine derivatives, para-phenylenes, diamines, quinolines, and blended amines.

Various fillers are often incorporated into the curing bladder compositions. They may be used, for example, in amounts of about 20 to about 80 phr. A preferred filler is carbon black. Elastomer reinforcing type fillers are preferred for use in curing bladders. Silica may be used in a very minor amount in addition to the carbon black. Silicas are generally described as amorphous silicas, particularly precipitated silicas. Fillers include reinforcing fillers such as carbon black which can be used, for example, in amounts from about 25 to about 75 phr. Typical carbon blacks that can be used include, for example, according to standard ASTM designations, acetylene black (e.g., N990), N110, N121, N220, N231, N234, N242, N293, N299, N326, N330, N332, N339, N343, N347, N351, N358, N375, N472, N539, N550, N683, N754, and N765, although acetylene black and N347 and/or N220 carbon blacks are usually preferred. Preferably, a major portion of the carbon black is acetylene black.

Various oils and waxes may be used in the curing bladder formulation depending upon the compatibility of the oils and waxes with the butyl rubber and the other components of the rubber formulation. They may be uniformly dispersed or they may desirably tend to phase separate (migrate to the surface) from the composition. Waxes include microcrystalline wax and paraffin wax. Oils include aliphatic-naphthenic aromatic resins, polyethylene glycol, petroleum oils, ester plasticizers, vulcanized vegetable oils, phenolic resin, polymeric esters and rosins. Waxes can be used in conventional individual amounts of 1–5 or up to 10 phr. They are usually considered plasticizers and modulus modifiers. Fatty acids such as stearic acid, palmitic acid and oleic acid may be used in amounts of 0.1–7 phr with a range of about 0.2–6 phr sometimes being more preferred. Zinc oxide may be present, for example, in amounts of about 2–15 phr.

Fluorinated ethylene polymers (PFE) may also be included in the composition. These PFE's can be selected from the representative and illustrative group of polymers including homopolymers and copolymers of fluorinated ethylene monomers selected from the group consisting of tetrafluoroethylene, vinyl fluoride, vinylidene fluoride, trifluoroethylene, and chloro trifluoroethylene. The preferred polymers are polytetrafluoroethylene (PTFE) and copolymers of tetrafluoroethylene and one or more of the above stated fluorinated ethylene monomers with PTFE being the most preferred. The fluorinated ethylene polymers desirably have greater than 50, 75, 85 or 95% repeat units having one or more fluorine atoms. The PFE polymers of particular utilities are particulate PFE's having particle sizes of 1–25 $\mu$m, preferably 1–10 $\mu$m and most preferably less than 6 $\mu$m. Other particle sizes are useable. However, the small particle size PFE's are preferred because the smaller particles disperse better during the rubber mixing processes. The fluorinated ethylene polymers are desirably present from about 0.5 or 1 to about 10 or 30 phr, more desirably from about 4 to about 10 or 15 phr.

The PFE's can be fibrillating or non-fibrillating and can be chosen from any of the commercial PFE polymers. Thus, the particulate fluorinated ethylene polymers may be converted to fibers during compounding of the rubber. One such particulate PFE is Polymist® F-5A from Ausimont of Morristown, N.J., U.S.A. However, other similar particulate PFE's can be utilized with equal advantage including those available from Dupont, such as Teflon®. When a polymer is recited as consisting essentially of tetrafluoroethylene repeat units herein it is meant that the polymer behaves as polymers from tetrafluoroethylene do in the composition even though trace amounts of initiator and chain transfer molecule fragments and/or other monomers may be present.

PFE compatibilizers known to the art may be used in these compositions or they may be excluded. They may be fluorine containing organic surfactants such as fluorocarbon surfactants from 3M Company named Fluorad® FC430. 3M characterizes their surfactant as a non-ionic surfactant of a fluorinated alkyl ester being 100% active and having a Brookfield viscosity at 25° C., spindle No. 3 at 6 rpm of 15,000 centipoise, a specific gravity of 1.15 at 25° C., a refractive index of 1.445 at 25° C., and a flash point above 300° F.

Other suitable PFE compatibilizers include Solsperse® 13940, which is distributed in the U.S. by ICI Americas Incorporated of Wilmington, Del. This material is described in material safety data sheets as a water-soluble liquid consisting of 40% polymeric fatty ester and 60% paraffinic solvent having a boiling point of 464–500° F. (240–260° C.) and a specific gravity of 0.840.

Graphite may be included in the rubber composition to modify the properties of the bladder, if desired. The graphite is desirably used in amounts from about 0.1 to about 20 phr, more desirably from about 0.5 to about 15 phr, and preferably from about 0.5 or 1 to about 5, 10, or 15 phr. Alternatively, molybdenum disulfide and/or tungsten disulfide can be partially or fully substituted for the amount of graphite. PFE, graphite, molybdenum disulfide and tungsten disulfide may also be used in combination.

The graphite that is desirably incorporated into the curing bladders may be natural or synthetic. The graphite is added during mixing of the bladder formulation and is, therefore, dispersed throughout the molded bladder. Natural graphite can be found in Madagascar, Ceylon, Mexico, Korea, Australia, the Russian Federation, and China. Synthetic graphite can be made from carbonaceous material such as by heating petroleum coke to approximately 3000° C. in an electric resistance furnace. A preferred graphite (to aid in uniform dispersion) is a powdery form such that greater than 80 wt. % of the graphite passes through a 325 mesh U.S. Standard screen, more desirably greater than 90 wt. % and preferably greater than 99 wt. % passes through said screen mesh.

A procedure for mixing and molding curing bladders in general and for the examples is given below. It may be varied. The bladders in the Examples are monolayer bladders of uniform composition except for any migration of chemicals during or subsequent to molding and curing. In a Banbury mixer or the equivalent, the rubber polymers, carbon black, the oil, wax, zinc oxide and optionally particulate fluorinated ethylene polymers, and optionally graphite, were mixed and dispersed until the mix temperature reached 165° C. The material was dumped onto a sheet-off mill and cooled. The cooled material was added to a Banbury mixer or equivalent in a second mixing stage. In the second mixing stage (the productive stage), the curatives (including any neoprene rubber, resin, preferably brominated phenolic resin, and zinc oxide) were added and mixed until the mix temperature reached 115° C. The material was then dumped and cooled.

The curing bladder may be molded in an injection molding machine or a transfer molding machine. If transfer molding is selected, the material from the Banbury is extruded as a slug. A cure rheometer may be used to determine the approximate time to develop optimal cure at specific temperatures. The actual cure time will depend on heating rate and the gauge (thickness) of the curing bladder. The curing bladder desirably will have a toroidal shape. The curing bladder material tested in the examples was cured for 30 minutes at 190° C.

The curing bladders of this invention are useful for molding and curing various hydrocarbon materials including pneumatic vehicle tires and miscellaneous pneumatic tires for non-vehicle applications. Other hydrocarbon articles cured in bladder equipped presses include hoses, various sleeves, and air springs (a shock absorbing spring for commercial vehicles). The curing bladders have good lubricity, desirable release characteristics from cured hydrocarbon rubbers, extended dynamic flex life, and extended use lifetimes due to their enhanced thermal stability.

Typical properties of a curing bladder as produced are desirably a 300% Modulus of 4–10 MPa, an Elongation at Break of 200–1,000%, and a Shore A Hardness at 100° C. of 35–85. More desirably, the curing bladder has a 300% Modulus of 4–8 MPa, an Elongation at Break of 200–700%, and a Shore A Hardness of 40–70. With respect to adhesion, zero adhesion is most desirable. Thus, a Hot Peel Adhesion (95° C.) to an uncured butyl rubber innerliner is advantageously less than 40 N, and more advantageously less than 30 N. It would also be desirable for the curing bladder to exhibit a kinetic Coefficient of Friction (COF) (ASTM D4518), without additional lubrication, of 0–5, alternatively 0.2–4.

EXAMPLES

A first test was run to compare a control sample A containing no UHMWPE to a test sample B comprising 10 phr of UHMWPE. In test sample B, the carbon black content was reduced in an amount equivalent to the UHMWPE addition. The compositions of the sample A and sample B compounds are provided in Table 1 below. The properties of the cured bladders are provided in Table 2. Sample B containing the UHMWPE exhibited a significantly lower adhesion of the cured butyl bladder compound to the uncured bromobutyl innerliner, as well as a lower average tear propagation, which will extend the life of the bladder.

TABLE 1

| Bladder Compound | Control Sample A (phr) | Test Sample B (phr) |
|---|---|---|
| Non-Productive Stage | | |
| Butyl 268 [a] | 55 | 55 |
| Butyl 068 [a] | 40 | 40 |
| Carbon Black [b] | 55 | 45 |
| UHMWPE [c] | 0 | 10 |
| Castor Oil [d] | 6 | 6 |
| Wax | 5 | 5 |
| Zinc Oxide | 0.5 | 0.5 |
| Fatty Acid [e] | 0.5 | 0.5 |
| Productive Stage | | |
| Phenolic Resin [f] | 9 | 9 |
| Polychloroprene Rubber [g] | 5 | 5 |
| Zinc Oxide | 4.5 | 4.5 |

[a] Butyl polymers from Exxon Mobil
[b] Mixture of acetylene black and N347 black
[c] GUR2122 from Ticona
[d] MOR from the Alnor Company
[e] Primarily stearic acid with minor amounts of palmitic acid and oleic acid
[f] Phenol formaldehyde resin
[g] Neoprene ® TRT from the DuPont de Nemours Company

TABLE 2

| Properties | Control Sample A | Test Sample B |
|---|---|---|
| Rheometer, 190° C. | | |
| $T_{90}$, minutes. | 20.9 | 21.7 |
| Stress-Strain | | |
| 100% Modulus, MPa | 1.49 | 1.65 |
| 300% Modulus, MPa | 4.58 | 4.99 |
| Tensile Strength, MPa | 10.4 | 9.4 |
| Elongation at break, % | 685 | 585 |
| Hardness, Shore A | | |
| RT | 65 | 62 |
| 100° C. | 50 | 47 |
| Rebound, % | | |
| RT | 11 | 12 |
| 100° C. | 42 | 48 |
| 95° C. Peel Adhesion [a] | | |
| Newtons | 56 | 28 |
| Kinetic COF [b] | 1.88 | 1.90 |
| Average Tear Propagation, cm [c] | | |
| 240 min. | 1.24 | 1.04 |

[a] Adhesion of cured butyl compound to uncured bromobutyl innerliner
[b] COF refers to Coefficient of Friction
[c] Pierced groove flex test measuring propagation of original pierced area Tests were carried out to compare samples containing graphite or a combination of graphite and UHMWPE. Sample C is the control sample, which contains neither UHMWPE nor graphite. Test sample D contains no UHMWPE, but contains 4 phr of graphite. Test sample E of the present invention contains 10 phr UHMWPE and 4 phr graphite. In tests D and E, no reduction was made in carbon black content to compensate for the addition of graphite and UHMWPE. The compositions are set forth below in Table 3. The properties for control sample C and test samples D and E are provided in Table 4. Inclusion of UHMWPE and graphite in test sample E of the present invention lowers the average tear propagation significantly beyond the effect obtained by graphite alone. A small reduction in kinetic coefficient of friction is also achieved.

TABLE 3

| Bladder Compound | Control Sample C (phr) | Test Sample D (phr) | Test Sample E (phr) |
|---|---|---|---|
| Non-Productive Stage | | | |
| Butyl 268 | 57 | 57 | 57 |
| Butyl 068 | 38 | 38 | 38 |
| Carbon Black A [a] | 20 | 20 | 20 |
| Carbon Black B [b] | 35 | 35 | 35 |
| UHMWPE | 0 | 0 | 10 |
| Castor Oil | 7.5 | 7.5 | 7.5 |
| Wax | 2 | 2 | 2 |
| Zinc Oxide | 0.5 | 0.5 | 0.5 |
| Graphite [c] | 0 | 4 | 4 |
| Productive Stage | | | |
| Phenolic Resin | 9 | 9 | 9 |
| Polychloroprene Rubber | 5 | 5 | 5 |
| Zinc Oxide | 4.5 | 4.5 | 4.5 |

[a] N347 carbon black
[b] Acetylene carbon black
[c] Synthetic graphite 1442 from Dixon Ticonderoga

TABLE 4

| Properties | Control Sample C | Test Sample D | Test Sample E |
|---|---|---|---|
| Rheometer, 190° C. | | | |
| $T_{90}$, minutes | 27.3 | 28.3 | 22.5 |
| Stress-Strain | | | |
| 100% Modulus, MPa | 1.83 | 2.10 | 2.09 |
| 300% Modulus, MPa | 5.42 | 4.64 | 4.76 |
| Tensile Strength, MPa | 8.8 | 8.4 | 9.3 |
| Elongation at break, % | 504 | 548 | 588 |
| Hardness, Shore A | | | |
| RT | 71 | 65 | 63 |
| 100° C. | 57 | 52 | 51 |
| Rebound, % | | | |
| RT | 12 | 11 | 11 |
| 100° C. | 41 | 43 | 44 |
| 95° C. Peel Adhesion | | | |
| Newtons | — | — | — |
| Kinetic COF | 2.44 | 2.24 | 2.39 |
| Average Tear Propagation, cm | | | |
| 240 min. | 2.31 | 1.42 | 0.99 |

Tests were carried out to compare the combination of UHMWPE, graphite and PFE to the combination of UHMWPE and graphite. Control sample F was formulated without any UHMWPE, graphite or Teflon®. Test sample G contains 15 phr of UHMWPE and 6 phr of graphite, and does not contain Teflon®. Test sample H contains 15 phr of UHMWPE, 8 phr of graphite, and 2 phr of Teflon®. The compositions for control sample F and test samples G and H are provided below in Table 5. Table 6 sets forth the properties for the three samples. The combination of UHMWPE, graphite and PFE resulted in a significant reduction in the adhesion of the curing bladder compound to the uncured bromobutyl innerliner, and a slight reduction in the kinetic COF.

TABLE 5

| Bladder Compound | Control Sample F (phr) | Test Sample G (phr) | Test Sample H (phr) |
|---|---|---|---|
| Non-Productive Stage | | | |
| Butyl 268 | 57 | 57 | 57 |
| Butyl 068 | 38 | 38 | 38 |
| N347 Carbon Black | 20 | 20 | 20 |
| Acetylene Black | 35 | 35 | 35 |
| UHMWPE | 0 | 15 | 15 |
| Graphite | 0 | 6 | 8 |
| PFE [a] | 0 | 0 | 2 |
| Castor Oil | 7.5 | 0 | 6 |
| Wax | 2 | 2 | 2 |
| Zinc Oxide | 0.5 | 0.5 | 0.5 |
| Productive Stage | | | |
| Phenolic Resin | 9 | 9 | 9 |
| Polychloroprene Rubber | 5 | 5 | 5 |
| Zinc Oxide | 4.5 | 4.5 | 4.5 |

[a] Polymist ® F-5A from Ausimont USA, Inc.

TABLE 6

| Properties | Control Sample F | Test Sample G | Test Sample H |
|---|---|---|---|
| Rheometer, 190° C. | | | |
| $T_{90}$, mins. | 25.8 | 27.5 | 25.1 |
| Stress-Strain | | | |
| 100% Modulus, MPa | 1.56 | 2.58 | 2.95 |
| 300% Modulus, MPa | 3.74 | 6.55 | 6.83 |
| Tensile Strength, MPa | 10.4 | 6.9 | 6.9 |
| Elongation at break, % | 744 | 407 | 383 |
| Hardness, Shore A | | | |
| RT | 65 | 75 | 78 |
| 100° C. | 53 | 65 | 67 |
| Rebound, % | | | |
| RT | 11 | 12 | 12 |
| 100° C. | 41 | 40 | 41 |
| 95° C. Peel Adhesion | | | |
| Newtons | 21.9 | 19.6 | 10.7 |
| Kinetic COF | 2.2 | 2.2 | 2.1 |

From the above examples, it may appreciated that the incorporation of UHMWPE into a butyl rubber bladder formulation, either alone or in combination with graphite and/or PFE, results in a reduction of adhesion of the bladder compound to a tire innerliner or other hydrocarbon-based rubber component. The average tear propagation for the curing bladders may also be reduced, thereby increasing the useful life of the bladder.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An expandable curing bladder composition, based upon parts by weight per 100 parts by weight rubber (phr), comprising:
    butyl rubber as at least one isobutylene rubbery polymer;
    at least one curative including from about 0.5–12 phr of a halogenated phenolic resin curative for crosslinking the isobutylene rubbery polymer; and
    about 2 to about 40 phr of ultra high molecular weight crystalline and linear polyethylene (UHMWPE) having a melting point in the range of from about 125° C. to about 140° C. and a viscosity average molecular weight in a range of from about 2 to about 20 million g/mol.

2. The composition of claim 1 wherein the UHMWPE is in a particulate substantially spherical form.

3. The composition of claim 1 wherein the UHMWPE has a viscosity average molecular weight in a range of from about 5 to about 15 million g/mol.

4. The composition of claim 1 wherein the at least one curative includes polychloroprene rubber and phenol-formaldehyde resin.

5. The composition of claim 1 further comprising about 0.5 to about 10 phr of at least one fluorinated ethylene polymer.

6. The composition of claim 5 wherein the at least one fluorinated ethylene polymer consists essentially of tetrafluoroethylene units.

7. The composition of claim 5 further comprising about 0.1 to about 20 phr of at least one of graphite, molybdenum disulfide and tungsten disulfide.

8. The composition of claim 1 further comprising about 0.1 to about 20 phr of at least one of graphite, molybdenum disulfide and tungsten disulfide.

9. The composition of claim 1 further comprising about 0.5 to about 15 phr of at least one of graphite and polytetrafluoroethylene powder.

10. The composition of claim 1 further comprising from about 2 to about 8 phr of at least one of castor oil, corn oil and soya-bean oil.

11. The composition of claim 10 wherein the oil is castor oil.

12. The composition of claim 1 further comprising about 45–60 phr of carbon black.

13. A tire curing press containing a cured bladder formed from the expandable curing bladder composition of claim 1 to assist in shaping and curing an uncured toroidal pneumatic rubber tire.

14. A method of using an expandable rubber bladder to shape and cure a hydrocarbon rubber, the method comprising:
    inserting an uncured hydrocarbon rubber composition into a curing mold having an expandable rubber bladder positioned therein and at least one other mold surface, wherein the bladder comprises a cured form of the composition of claim 1;
    closing the mold and expanding the bladder outwardly against an inner surface of the uncured hydrocarbon rubber to force the uncured hydrocarbon rubber against the at least one other mold surface;
    curing the hydrocarbon rubber under conditions of heat and pressure,
    deflating the expandable bladder; and
    removing the cured hydrocarbon rubber from the curing mold.

15. An expandable curing bladder composition, based upon parts by weight per 100 parts by weight rubber (phr), comprising:
    butyl rubber as at least one isobutylene rubbery polymer;
    a curative for crosslinking the isobutylene rubbery polymer comprising about 1–10 phr of polychloroprene rubber and about 1–12 phr of phenol-formaldehyde resin;
    about 2–40 phr of ultra high molecular weight crystalline and linear polyethylene (UHMWPE) having a melting point in the range of from about 125° C. to about 140° C. and a viscosity average molecular weight in a range of from about 2 to about 20 million g/mol;
    about 1–15 phr of at least one of graphite and polytetrafluoroethylene;
    about 2–8 phr of at least one of castor oil, corn oil and soya-bean oil; and
    about 20–80 phr of carbon black filler.

16. The composition of claim 15 further comprising about 2–15 phr of zinc oxide, about 0.1–7 phr of fatty acids, and about 1–10 phr of wax.

17. A tire curing press containing a cured bladder formed from the expandable curing bladder composition of claim 15 to assist in shaping and curing an uncured toroidal pneumatic rubber tire.

18. A method of using an expandable rubber bladder to shape and cure a hydrocarbon rubber, the method comprising:
    inserting an uncured hydrocarbon rubber composition into a curing mold having an expandable rubber bladder positioned therein and at least one other mold surface, wherein the bladder comprises a cured form of the composition of claim 15;
    closing the mold and expanding the bladder outwardly against an inner surface of the uncured hydrocarbon rubber to force the uncured hydrocarbon rubber against the at least one other mold surface;
    curing the hydrocarbon rubber under conditions of heat and pressure,
    deflating the expandable bladder; and
    removing the cured hydrocarbon rubber from the curing mold.

* * * * *